N. KEELER.
POTATO DIGGING MACHINE.
APPLICATION FILED JUNE 11, 1914.
1,134,205.
Patented Apr. 6, 1915.
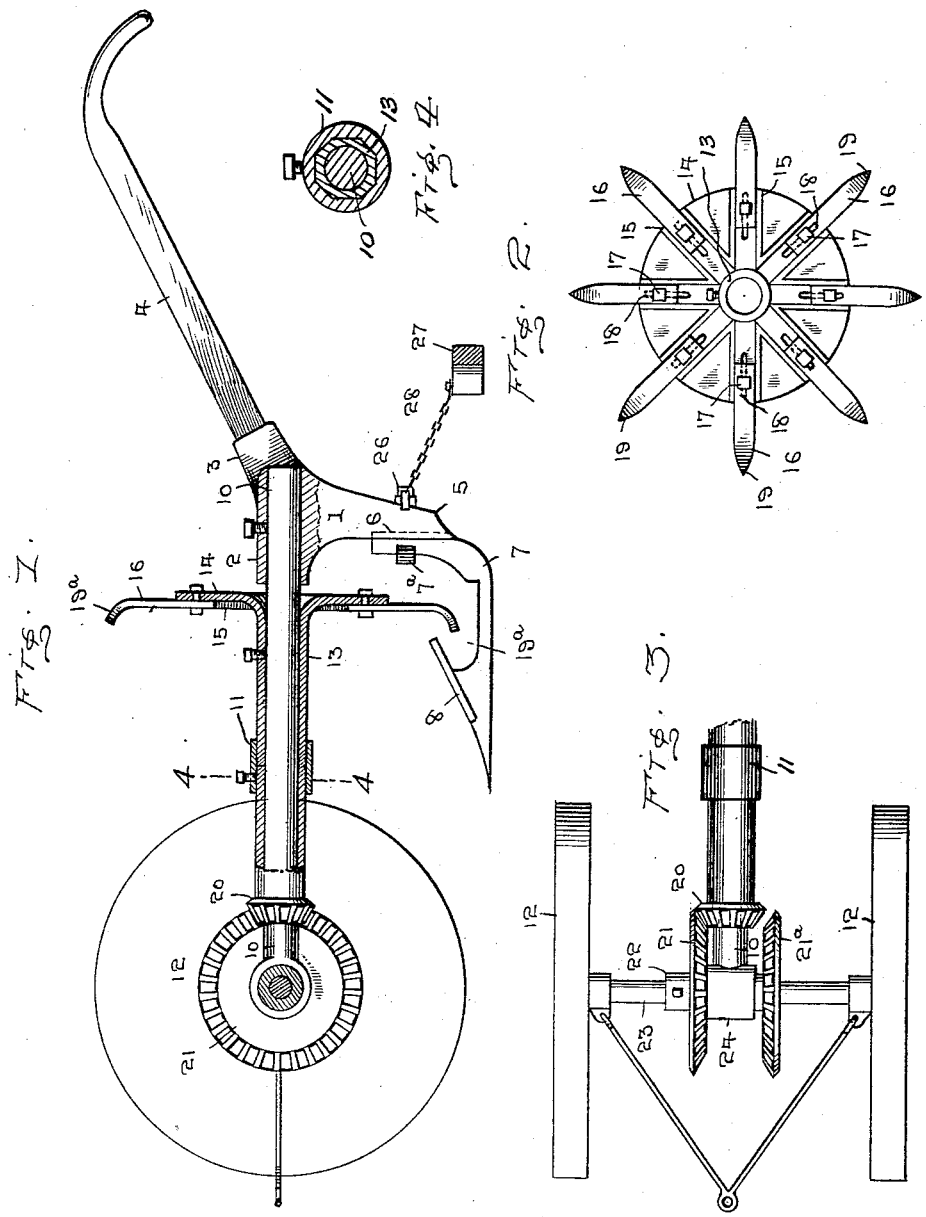

UNITED STATES PATENT OFFICE.

NOAH KEELER, OF WALLACE, NEW YORK.

POTATO-DIGGING MACHINE.

1,134,205.  Specification of Letters Patent.  Patented Apr. 6, 1915.

Application filed June 11, 1914. Serial No. 844,426.

*To all whom it may concern:*

Be it known that I, NOAH KEELER, a citizen of the United States, residing at Wallace, in the county of Steuben and State of New York, have invented certain new and useful Improvements in Potato-Digging Machines; and I do hereby declare the following to be a full, clear, and exact description of the invention, such as will enable others skilled in the art to which it appertains to make and use the same.

My invention relates to potato digging machines.

The object of my invention is to produce a machine that will remove the potatoes from the soil without bruising them and leave them in a free condition for gathering. One that will not cover up any that have been dug, and can be used to dig an entire field without having to pick up any if it is desired so to do.

In the following specifications reference is had to the accompanying drawings which are made a part of this application and in which, Figure 1 is a central longitudinal sectional view. Fig. 2 is a front view of the reel. Fig. 3 is a plan view of the traction wheels and driving gears. Fig. 4 is a cross-section on the dotted line 4—4 of Fig. 1 showing coupling.

For convenience of description, numerals will be used and the same numeral will be used throughout to designate the same part.

My invention consists of an improvement in potato digging machines in which a casting 1 forms the basis of construction, said casting having a horizontally extending body portion 2, with properly positioned sockets 3 attached thereto to receive the handles 4, and a depending arm 5 having a slot 6 in its front face to receive the upturned rear end of the shoe 7, said shoe 7 being adjustably mounted by a clamp 7ª in the slot 6 of the member 5. Members 2, 3 and 5 are cast integrally.

On the front of the shoe 7 the potato raising blade 8 is attached by bolts to the top side thereof. Immediately in the rear of the potato raising blade said shoe 7 has its width reduced to a minimum consistent with the strength required, and is set to run upon its edge and is formed so as to carry the potato raising blade higher than that part of the shoe 7 immediately in the rear thereof. The shoe 7 has an extending point carried under and beyond the front portion of the potato raising blade 8. Said casting 1 has an opening longitudinally extending throughout its body portion to receive the end of the fixed shaft 10 which carries the revolving, elongated, flange bearing collar 13 and connects the digging machine with the traction wheels 12. The said flange bearing collar 13 extends approximately to the middle of the shaft 10.

The flange 14 is provided with a plurality of ribs 15 forming seats for the arms 16 and having slots 18 provided in said seats to provide means whereby the sweep of the arms may be regulated. The collar, flange, and arms comprise a reel. A plurality of arms are adjustably mounted upon said flange 14, in the seats formed by said ribs 15, by a bolt 17 passing through a slot 18 in said flange 14 and through a hole in said reel arms. The said reel arms are formed preferably of steel bars and are sharpened at their outer ends 19 to prevent their becoming entangled with the potato tops. The points of said reel arms are bent forwardly as at 19ª to facilitate the separation of the potatoes from the soil. Upon the front end of the said shaft 10 is rotatively mounted a beveled pinion 20 having an elongated hub portion extending rearwardly to meet the flange bearing collar and said pinion 20 is operatively connected at will with the beveled gears 21 and 21ª which are fixedly mounted upon a sleeve 22 said sleeve being slidably mounted upon the shaft 23 connecting the traction wheels 12. The shaft 10 terminates in and is fixedly attached to a collar 24 loosely mounted on the sleeve 22. Any preferred means may be used to connect the sleeve 22 with the shaft 23. The elongated hub portion of the pinion 20 and the elongated flange bearing collar 13 are formed hexagonally on their outer surface where they meet on the shaft 10.

A loose fitting sleeve 11 of similar shape on its inner surface surrounds the two members at the point of contact forming a means of communicating the rotary motion of the pinion 20 to the flange bearing collar 13. By sliding said sleeve backwardly until the pinion hub is disengaged therefrom the rotary motion of the reel is prevented.

On the rear face and near the lower end of the dependent member 5 a cross arm 26 is fixed. A drag iron 27 is connected to and held parallel with said cross-arm by chains 28 and is allowed to drag on the ground for the purpose of filling the furrow made by the potato raising tool.

In the operation of my invention the shoe 7 is set sufficiently low to permit it to run in the soil below the potatoes, the potato raising blade 8 will then run just under the potatoes and as it is advanced it will loosen and raise them from their natural bed. The reel is adjusted so that the points of the arms will pass when rotating between the rear portion of the potato raising blade and the shoe 7 catching the potatoes at this point and throwing them out of the ground and clear of the loosened soil. In other types of potato digging machines all of the loose soil and potatoes are thrown, by the reels working on top of the plow to one side, depending on the spreading of the soil to make the separation, while in my invention the reel arms catch the potatoes and throw them to one side leaving the soil practically in its original location. After digging a row of potatoes when turning the machine the pinion 20 may be shifted to the opposite driving gear and thus reverse the direction in which the reel turns thereby being enabled to always throw the potatoes away from the row that has not been dug and thus permitting of the digging of an entire field without it being necessary to pick up the potatoes. The gathering of the potatoes can therefore be done at the pleasure of the operator.

At the rear of my potato digging machine is located a drag iron for the purpose of leveling the ground and filling the furrow made by the potato digging blade, to prevent the potatoes from rolling into said furrow and being covered up when the machine passes on a subsequent trip. Believing that from the foregoing description the construction, use and combination of parts are fully understood I deem further description to be unnecessary.

What I desire to secure by Letters Patent is:

1. In a potato digging machine, a combination with a pair of traction wheels; of a reel having a plurality of arms and means for rotating the said reel; a body portion; controlling handles therefor; a potato raising blade and means for connecting said blade to the body portion; means for connecting said body portion to said traction wheels, and a drag iron attached to said body portion.

2. A potato digging machine comprising a body; controlling handles therefor; a potato raising blade; a reversible rotating reel having a plurality of arms and means for rotating the said reel; a drag iron attached to said body portion whereby the furrow made by the blade is filled.

In testimony whereof I have signed my name to this specification in the presence of two subscribing witnesses.

NOAH KEELER.

Witnesses:
M. A. COOK,
FRANK H. ALLIS.

Copies of this patent may be obtained for five cents each, by addressing the "Commissioner of Patents, Washington, D. C."